United States Patent
Kim et al.

(10) Patent No.: US 10,405,229 B2
(45) Date of Patent: Sep. 3, 2019

(54) METHOD AND APPARATUS FOR CONTROLLING INTERFERENCE BETWEEN INTERNET OF THINGS DEVICES

(71) Applicant: Samsung Electronics Co., Ltd, Gyeonggi-do (KR)

(72) Inventors: Sang-Bum Kim, Gyeonggi-do (KR); Soeng-Hun Kim, Gyeonggi-do (KR); Han-Il Yu, Gyeonggi-do (KR); Ju-Ho Lee, Gyeonggi-do (KR); Jae-Hyuk Jang, Gyeonggi-do (KR); Kyeong-In Jeong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 62 days.

(21) Appl. No.: 15/506,678

(22) PCT Filed: Aug. 25, 2015

(86) PCT No.: PCT/KR2015/008866
§ 371 (c)(1),
(2) Date: Feb. 24, 2017

(87) PCT Pub. No.: WO2016/032203
PCT Pub. Date: Mar. 3, 2016

(65) Prior Publication Data
US 2017/0257794 A1    Sep. 7, 2017

(30) Foreign Application Priority Data

Aug. 26, 2014 (KR) .................... 10-2014-0111354

(51) Int. Cl.
*H04W 28/04* (2009.01)
*H04B 15/02* (2006.01)
(Continued)

(52) U.S. Cl.
CPC ............ *H04W 28/04* (2013.01); *H04B 15/02* (2013.01); *H04W 4/80* (2018.02); *H04W 72/082* (2013.01);
(Continued)

(58) Field of Classification Search
CPC ....... H04L 1/1664; H04L 1/0001; H04L 1/16; H04B 1/715; H04B 2001/7154;
(Continued)

(56) References Cited

U.S. PATENT DOCUMENTS 7,376,118 B2 * 5/2008 Osterloh .................. H04Q 9/00
                                                                    370/344
7,424,268 B2 * 9/2008 Diener .................. H04L 1/0001
                                                                    370/241
(Continued)

FOREIGN PATENT DOCUMENTS

CN    1830179 A    9/2006
CN    102318237 A    1/2012
(Continued)

OTHER PUBLICATIONS

International Search Report dated Dec. 23, 2015 in connection with International Application No. PCT/KR2015/008866, 4 pages.
(Continued)

*Primary Examiner* — Ayaz R Sheikh
*Assistant Examiner* — Debebe A Asefa

(57) ABSTRACT

Disclosed are a method and apparatus for controlling interference between Internet of Things (IoT) devices. The method for controlling interference between IoT devices includes: selecting a device that will execute interference avoidance among devices that are capable of performing an inter-thing communication by taking a traffic type into consideration; and receiving interference avoidance information required for the interference avoidance from the
(Continued)

device that will execute the interference avoidance. The interference avoidance information includes offset information representing a starting time.

20 Claims, 9 Drawing Sheets

(51) Int. Cl.
*H04W 72/12* (2009.01)
*H04W 76/28* (2018.01)
*H04W 4/80* (2018.01)
*H04W 72/08* (2009.01)

(52) U.S. Cl.
CPC ....... *H04W 72/1215* (2013.01); *H04W 76/28* (2018.02)

(58) Field of Classification Search
CPC .... H04B 17/18; H04B 17/382; H04B 1/1615; H04B 1/38; H04B 1/7143; H04B 15/02; H04W 28/04; H04W 4/80; H04W 72/082; H04W 72/1215; H04W 76/28
See application file for complete search history.

(56) References Cited

U.S. PATENT DOCUMENTS

| | | |
|---|---|---|
| 2005/0033816 A1 | 2/2005 | Yamaguchi et al. |
| 2011/0222523 A1 | 9/2011 | Fu et al. |
| 2012/0040715 A1* | 2/2012 | Fu .................. H04B 1/1027 455/553.1 |
| 2012/0082140 A1* | 4/2012 | Lin .................. H04W 72/1215 370/336 |
| 2013/0077552 A1 | 3/2013 | Lee |
| 2013/0090142 A1 | 4/2013 | Lee et al. |
| 2015/0131613 A1* | 5/2015 | Jung ................ H04W 24/10 370/331 |

FOREIGN PATENT DOCUMENTS

| | | |
|---|---|---|
| WO | 2009002044 A2 | 12/2008 |
| WO | 2011/110108 A1 | 9/2011 |
| WO | 2014/027867 A1 | 2/2014 |
| WO | 2014045832 A1 | 3/2014 |
| WO | 2014046579 A1 | 3/2014 |
| WO | 2014/070101 A1 | 5/2014 |

OTHER PUBLICATIONS

Written Opinion of the International Searching Authority dated Dec. 23, 2015 in connection with International Application No. PCT/KR2015/008866, 7 pages.
Oladayo Bello, et al., Intelligent Device-to-Device Communication in the Internet of Things, IEEE Systems Journal, Jan. 27, 2014, vol. PP, Issue 99, 11 pages.
Qualcomm Incorporated, "Techniques for D2D Communication" 3GPP TSG-RAN WG1 #73, R1-132504, Fukuoka, Japan, May 20-24, 2013, 13 pages.
Supplementary European Search Report dated Mar. 21, 2018 in connection with European Patent Application No. 15 83 5279.
Communication from a foreign patent office in a counterpart foreign application, SIPO, "Text of the First Office Action," Application No. CN 2015800453574, dated May 30, 2018, 17 pages.
European Patent Office, "Communication pursuant to Article 94(3) EPC," Application No. EP15835279.9, dated Nov. 19, 2018, 7 pages.

* cited by examiner

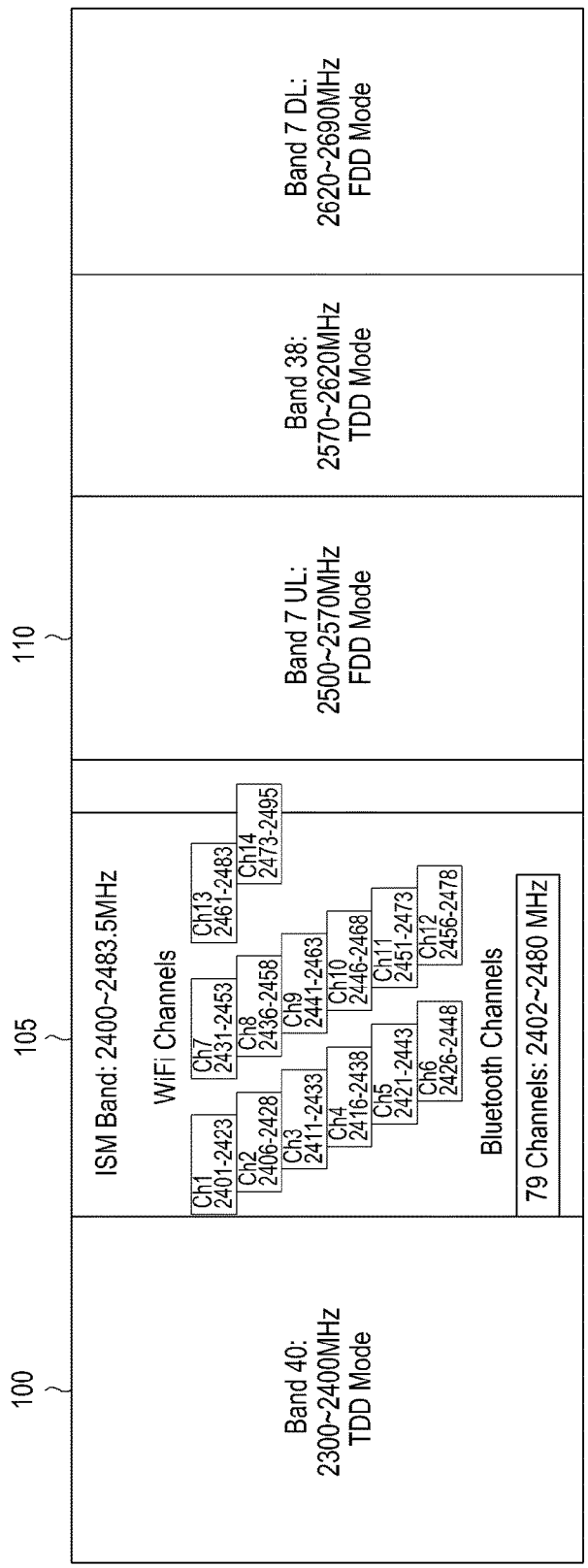
[Fig. 1]

[Fig. 2]
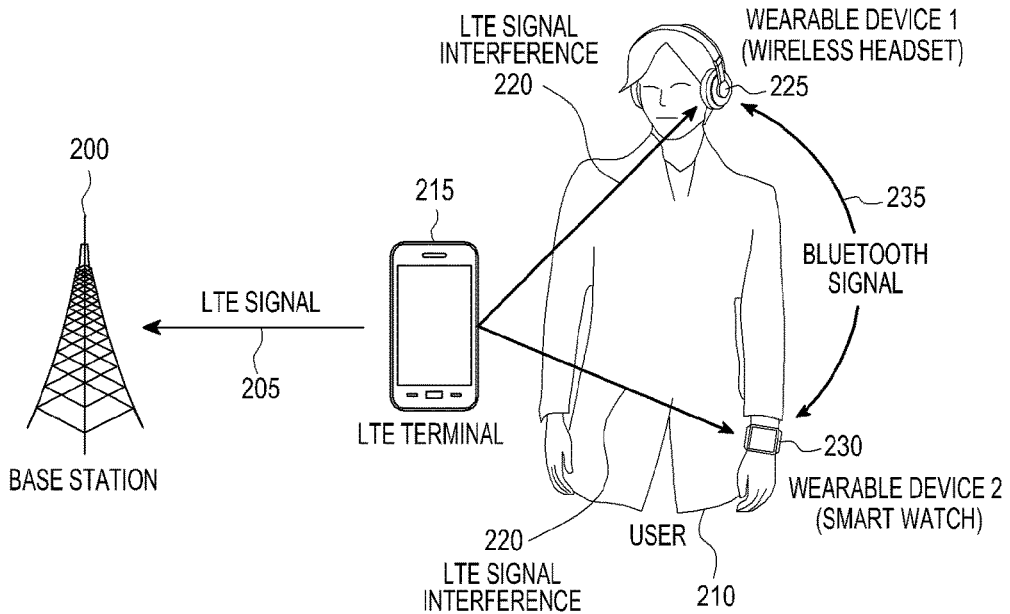
[Fig. 3]
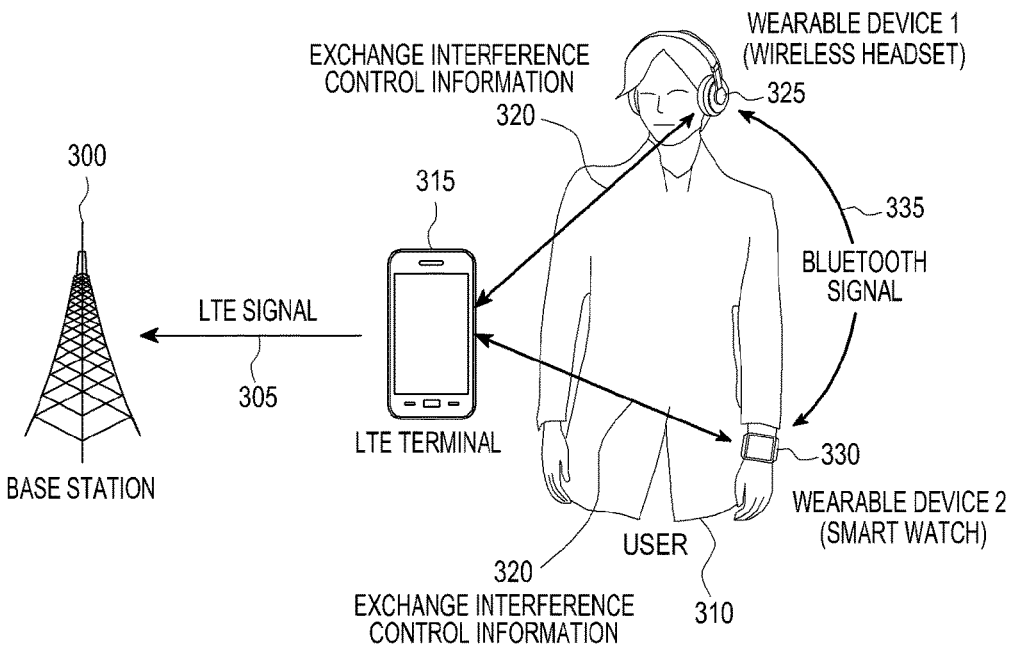

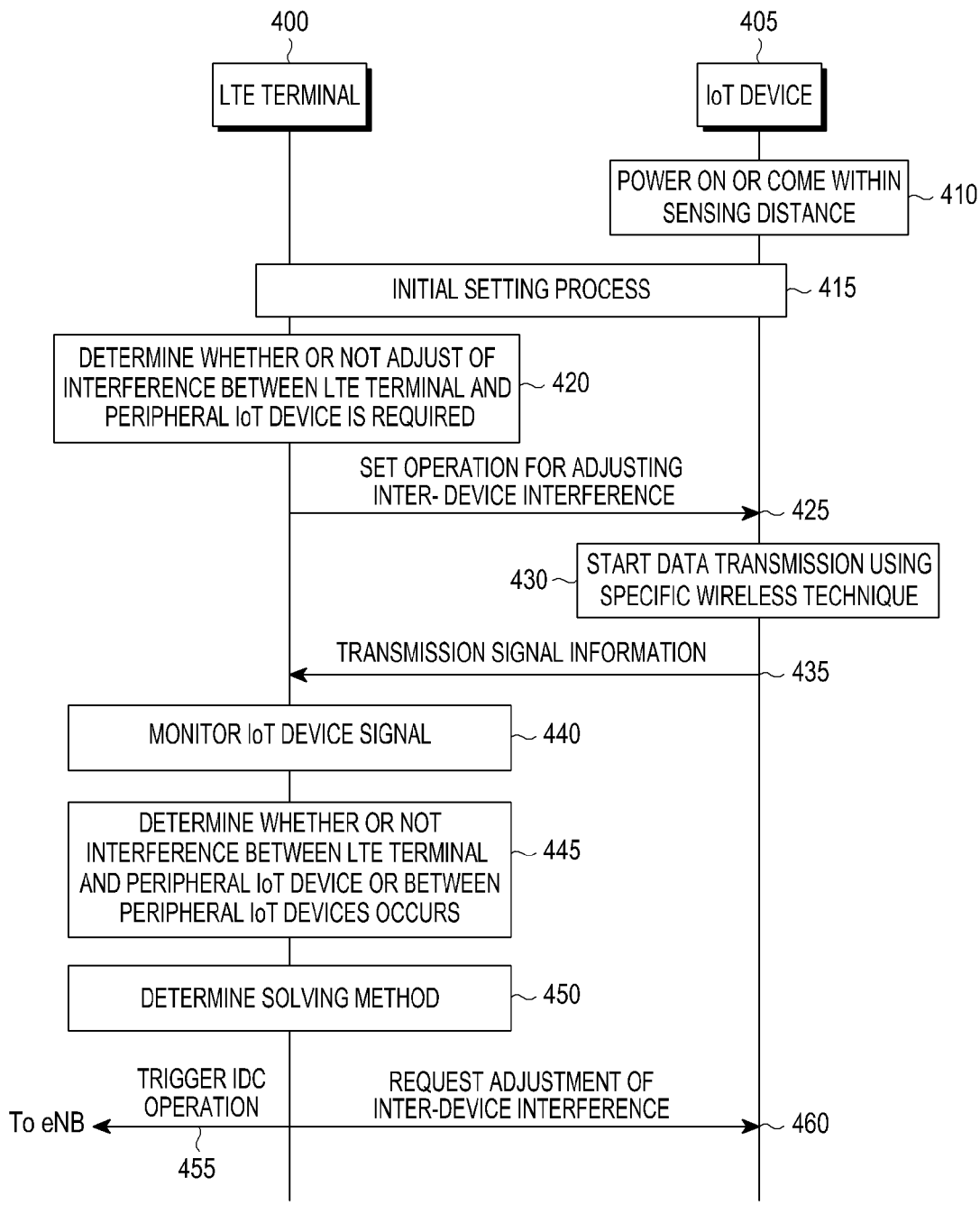
[Fig. 4]

[Fig. 5]
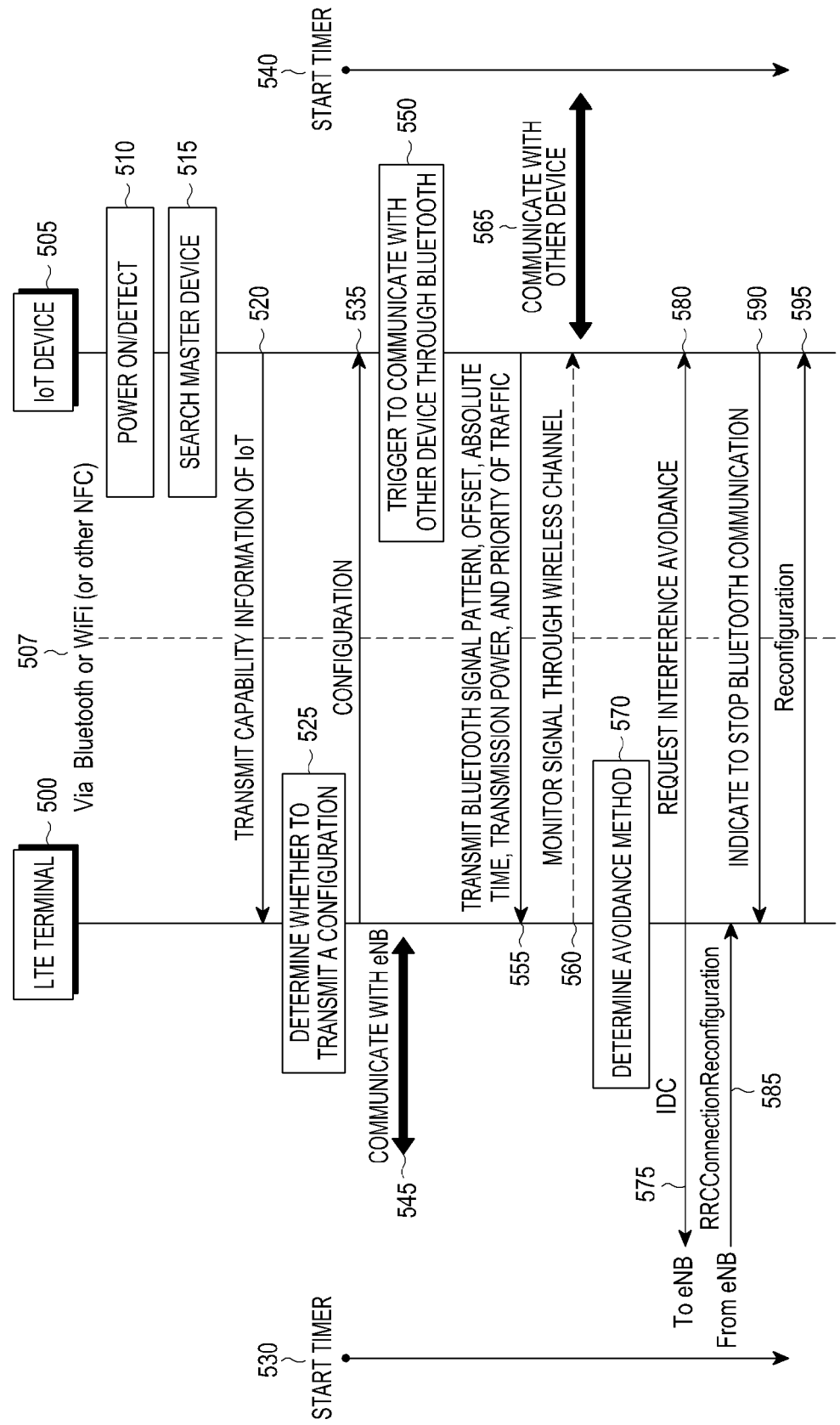

[Fig. 6]
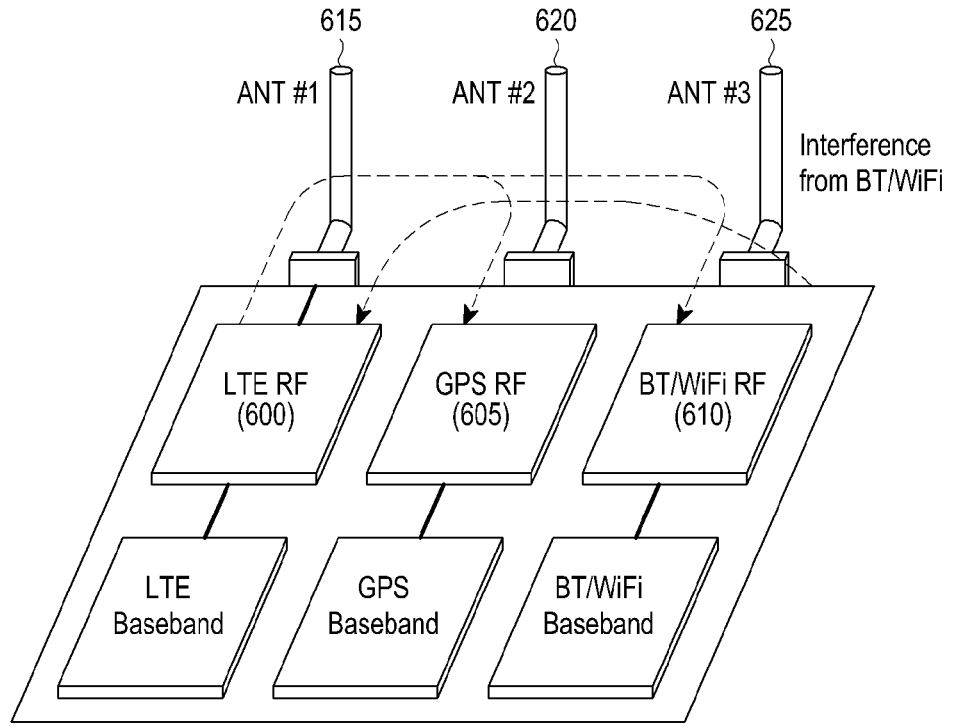
[Fig. 7]
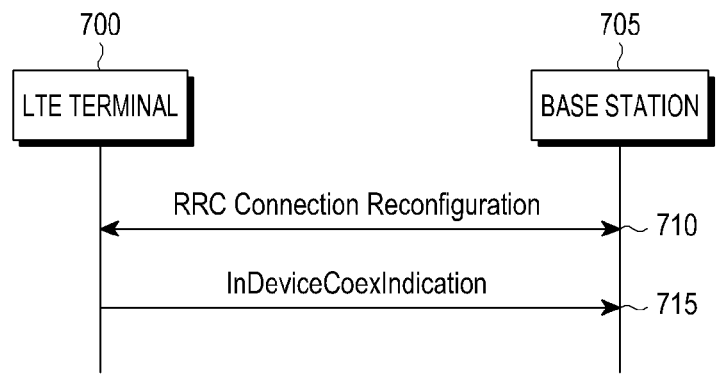

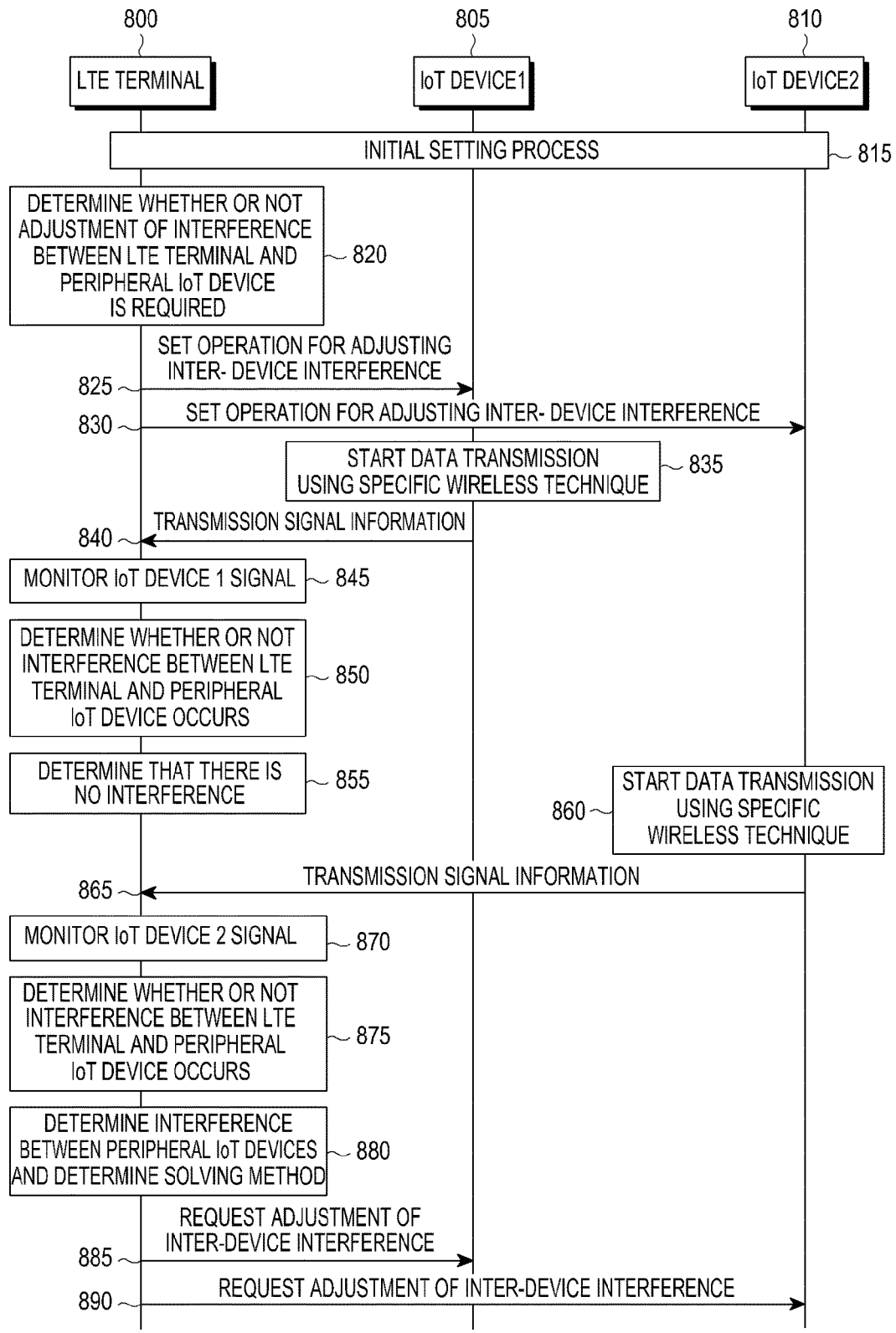
[Fig. 8]

[Fig. 9]
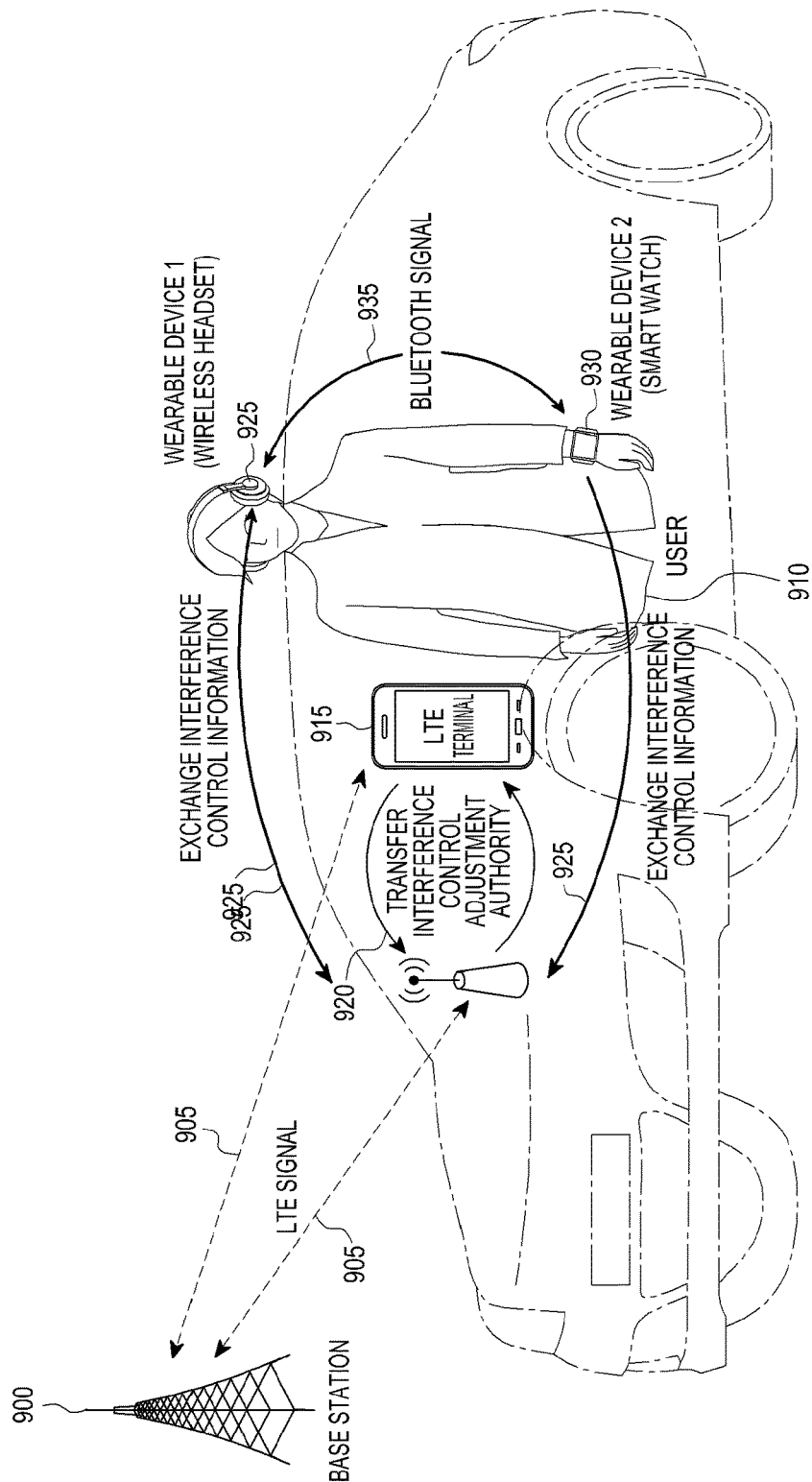

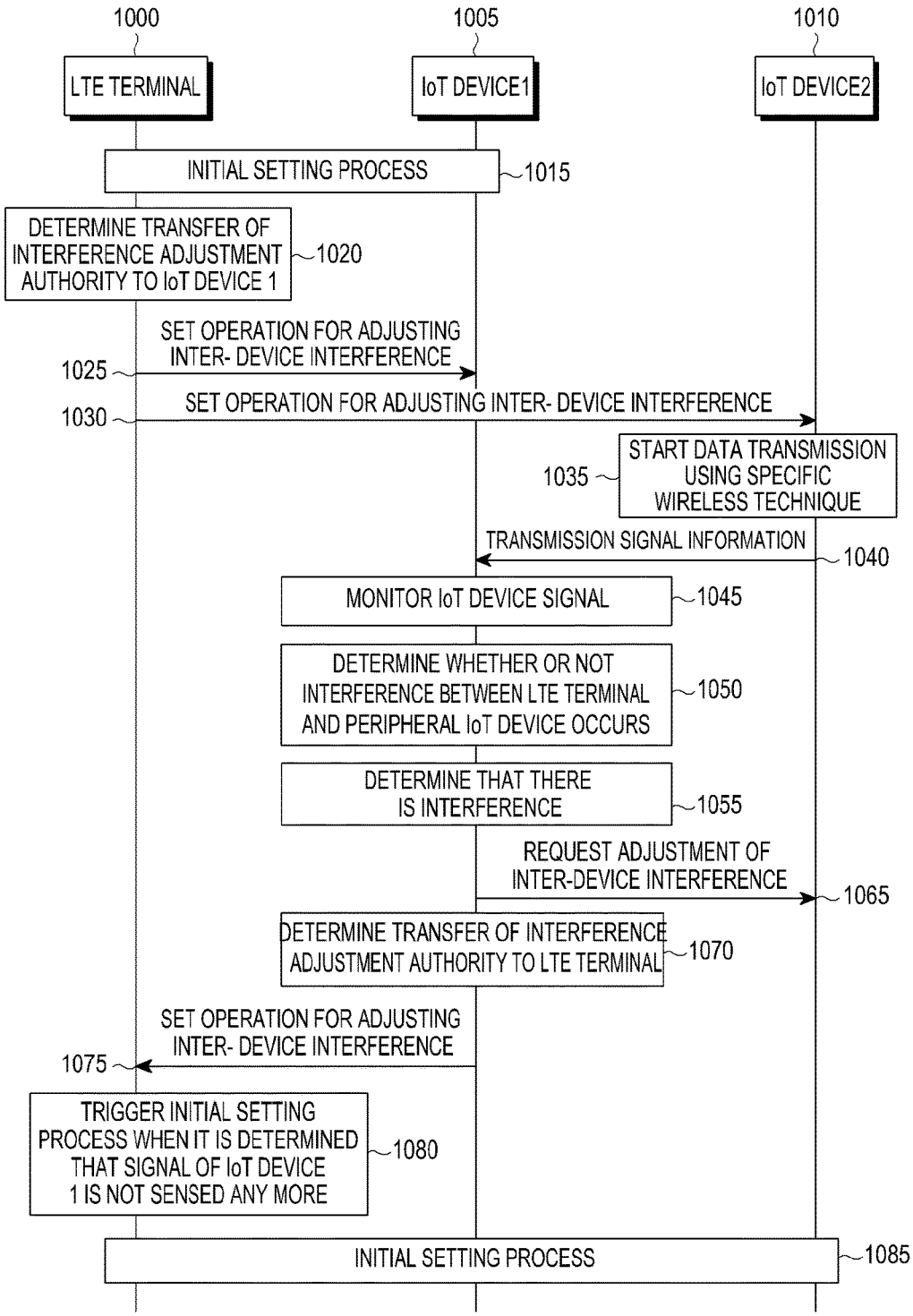

[Fig. 11]
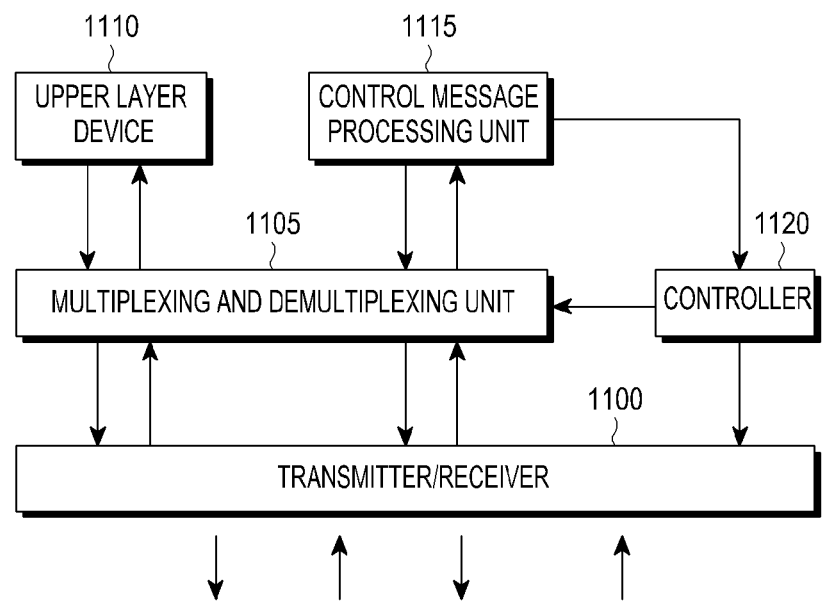

METHOD AND APPARATUS FOR CONTROLLING INTERFERENCE BETWEEN INTERNET OF THINGS DEVICES

CROSS-REFERENCE TO RELATED APPLICATION(S)

The present application claims priority under 35 U.S.C. § 365 to International Patent Application No. PCT/KR2015/008866 filed Aug. 25, 2015, entitled "METHOD AND APPARATUS FOR CONTROLLING INTERFERENCE BETWEEN INTERNET OF THINGS DEVICES", and, through International Patent Application No. PCT/KR2015/008866, to Korean Patent Application No. 10-2014-0111354 filed Aug. 26, 2014, each of which are incorporated herein by reference into the present disclosure as if fully set forth herein.

TECHNICAL FIELD

The present disclosure relates to a method and apparatus for controlling interference between Internet of things devices.

BACKGROUND ART

In general, a mobile communication system was developed for the purpose of providing a communication service while securing a user's mobility. The mobile communication system is at the stage of being capable of providing not only voice communications but also high speed data communication services owing to the rapid progress in development of techniques. A short-range communication technique has also made rapid progress such that one user tends to have various short-range communication devices in addition to a mobile communication terminal.

DISCLOSURE OF INVENTION

Technical Problem

The advanced communication technique has enabled communication between all things, which is represented by a term, "Internet of Things (IoT)," as well as inter-user communications. For example, one user may use various kinds of electronic devices, all of which may be interconnected with each other through a mobile communication or short-range communication technique or various sensors so as to provide more convenient functions to the user or to enable efficient inter-device control. Such electronic devices may be generally called IoT devices.

The IoT devices include a mobile communication module, such as long term evolution (LTE), or a near short-range communication module, such as Bluetooth, Wireless Fidelity (WiFi), zigbee, or Near-Field Communication (NFC). At this time, there may be a case in which frequency bands used by respective communication modules are adjacent to each other.

Solution to Problem

The present disclosure provides a method and apparatus for solving a problem of interference between IoT devices (hereinafter, also referred to as "inter-IoT device interference").

According to an embodiment of the present disclosure, there is provided an apparatus for controlling an interference among devices in a terminal. The apparatus includes: a controller is configured to select a device that will execute interference avoidance among devices that are capable of performing an inter-devices communication based on a traffic type; and a reception unit is configured to receive interference avoidance information required for the interference avoidance from the selected device. The controller determines an interference avoidance method based on the interference avoidance information.

According to another embodiment of the present disclosure, there is provided an apparatus for avoiding an interference in a device among devices. The apparatus includes: a reception unit is configured to receive from a terminal a message notifying that a device that will execute an interference avoidance is selected among devices that are capable of performing an inter devices communication based on a traffic type; and a transmission unit is configured to transmit interference avoidance information required for the interference avoidance to the terminal. An interference avoidance method is based on the interference avoidance information.

According to another embodiment of the present disclosure, there is provided an apparatus for controlling an interference among devices in a terminal. The apparatus includes: a controller is configured to determine to transfer the authority to at least one of device that will execute interference avoidance, and transmit an indicator for indicating the authority transfer to the determined device. The determined device selects a device that will execute interference avoidance among devices that are capable of performing an inter-devices communication based on a traffic type, and receives interference avoidance information required for the interference avoidance from the selected device, and an interference avoidance method is based on the interference avoidance information.

According to another embodiment of the present disclosure, there is provided an apparatus for avoiding an interference in a device among devices. The apparatus includes: a controller is configured to receive an indicator for indicating an authority transfer from a terminal, select a device that will execute interference avoidance among devices that are capable of performing an inter-devices communication based on a traffic type, and receive interference avoidance information required for the interference avoidance from the selected device. An interference avoidance method is based on the interference avoidance information.

The present disclosure can solve a problem of inter-IoT device interference.

BRIEF DESCRIPTION OF DRAWINGS

The above and other aspects, features, and advantages of the present disclosure will be more apparent from the following detailed description taken in conjunction with the accompanying drawings, in which:

FIG. 1 is a view illustrating schematized frequency bands adjacent to an ISM band 100 among frequencies which are currently used for mobile communication in 3GPP;

FIG. 2 is a view for describing an example of an inter-IoT device interference scenario in the present disclosure;

FIG. 3 is a view for conceptually describing a method of avoiding inter-IoT device interference in the present disclosure;

FIG. 4 is a flowchart for describing a method of avoiding inter-IoT device interference in the present disclosure;

FIG. 5 is a flowchart for describing a procedure of controlling inter-IoT device interference in a case where a main agent for controlling interference in the present disclosure is an LTE terminal;

FIG. 6 is a view for describing IDC which is an existing LTE technique;

FIG. 7 is a view for describing a procedure in which a terminal provides information required for minimizing IDC interference in an existing LTE standard to a base station;

FIG. 8 is a flowchart for describing a process in which an IoT device authorized to control interference controls interference between the other IoT devices;

FIG. 9 is a view for conceptually describing a procedure in which an authority of controlling interference is transferred to another IoT device;

FIG. 10 is a flowchart for describing a procedure in which an authority of controlling interference is transferred to another IoT device; and FIG. 11 is a block diagram illustrating an internal configuration of a terminal.

MODE FOR THE INVENTION

Hereinafter, embodiments of the present disclosure will be described in detail with reference to the accompanying drawings. At this time, the same elements will be designated by the same reference numerals although they are shown in different drawings. Further, a detailed description of a known function and configuration which may make the subject matter of the present disclosure unclear will be omitted.

Further, terms or words used in the description and claims below should not be interpreted as only general or dictionary meanings, but interpreted as meanings and concepts satisfying the technical spirit of the present disclosure based on a principle in that the inventor can appropriately define his/her disclosure with a concept of the terms in order to describe the disclosure in the best method.

The term "LTE terminal" or "terminal" used herein below means a mobile terminal capable of high speed wireless communication. As an example, the LTE terminal or terminal may be a Personal Digital Assistant (PDA) having a communication function, a smart phone, a portable phone, a tablet computer, or a note computer, and is capable of accessing a plurality of IoT devices. The terms, "LTE terminal" and "terminal" will be interchangeably used in the whole range of the specification.

An LTE terminal may be operated on an LTE carrier frequency or on an ISM band.

A short-range communication technique to be described below may mean, for example, Bluetooth, wireless LAN, zigbee, or NFC, but is not limited thereto.

FIG. 1 is a view illustrating schematized frequency bands adjacent to an Industrial Scientific and Medical (ISM) band 100 among frequencies which are currently used for mobile communication in 3GPP.

It may be understood that in a case where a mobile communication cell uses Band 40 105, an interference phenomenon becomes severe when Channel 1 is used as a wireless LAN channel, and in a case where the mobile communication cell uses Band 7 110, the interference phenomenon becomes severe when Channel 13 or Channel 14 is used as the wireless LAN channel. When one user has a plurality of IoT devices, the distances between the respective IoT devices are defined, for example, within a human body size, and it is expected that the above-mentioned interference will be deepened. In fact, tests between commercially available products show such interference.

The present disclosure provides a method and apparatus for causing one IoT device to control and adjust interference between a plurality of other IoT devices, including the one IoT itself. The IoT device configured to adjust the interference requests itself or other IoT devices to execute an interference avoidance method according to a prescribed rule, such as whether or not interference practically occurs, traffic significance (or priority) of each IoT device, or supremacy of an avoidance method. In addition, the interference adjustment authority may be transferred to another IoT device according to a prescribed rule.

FIG. 2 is a view for describing an example of an inter-IoT device interference scenario in the present disclosure.

For example, a user 210 has three kinds of IoT devices in total. One IoT device is an LTE terminal 215 which is mainly used for a data service, such as web surfing, and voice/video calling. The other IoT devices are a wireless headset 225, and a smart watch 230.

The wireless head-set 225 is capable of receiving and reproducing a music file without a wire using a short-range communication technique, such as Bluetooth.

The smart watch 230 may execute various functions. The smart watch 230 may provide, for example, schedule management, an alarm, exercise management, entertainment (e.g., music or movie) functions in addition to a basic function of providing time information. In addition, the smart watch 230 may collect body information of the user 210, for example, checking of heart rate or blood sugar. At this time, the IoT devices may be interconnected with each other using the short-range communication technique. As an example, when a music file is stored in the smart watch 230, the music file may be transmitted to the wireless headset 225 using, for example, Bluetooth communication.

The wireless headset 225 reproduces the received music file for the user 210. At this time, the user 210 may attempt data communication using the LTE terminal 215. At this time, the LTE terminal 215 transmits an LTE signal 205 to the base station 200. The LTE signal 205 may interfere with a Bluetooth signal between the wireless headset 225 and the smart watch 230 (220). In contrast, the Bluetooth signal 235 may act as an interference source to the LTE signal 205. For this interference, the frequency band used by the LTE signal 205 should be adjacent to the ISM band used for the Bluetooth communication, the signals should have a signal intensity to cause the interference.

FIG. 3 is a view for conceptually describing a method of avoiding inter-IoT device interference in the present disclosure.

A user 310 includes, for example, three kinds of IoT devices in total, such as an LTE terminal 315, a wireless headset 325, and a smart watch 330. At this time, the LTE terminal 315 serves as a main agent that controls inter-IoT device interference, and the other IoT devices 325 and 330 should recognize this fact in advance. In general, an IoT device always carried by the user may be selected as the main agent that controls interference between the IoT devices owned by the user. An example of the main agent that controls inter-IoT device interference may be, for example, the LTE terminal (smart phone) 315 or the smart watch 330. This is because, when the user leaves a main agent device that controls interference and moves away from the main agent device, it is necessary to select a new main control agent device among the IoT devices owned by the user, and thus, operational complexity such as signaling overhead increases. As another example, a control for inter- IoT device interference within a house may be set by a main agent device that controls interference between home appliances fixedly positioned within the house. The present disclosure is characterized by the fact that interference control information is exchanged between the main agent that controls the interference and the other IoT devices (320) so as to control the interference between the LTE terminal and the other IoT devices.

FIG. 4 is a flowchart for describing a method of avoiding inter-IoT device interference in the present disclosure.

Although FIG. 4 illustrates one IoT device like an IoT device 405, a plurality of IoT devices may be provided, and the operations in FIG. 4 may also be applied to the plurality of IoT devices.

Although not illustrated in FIG. 4, for example, the IoT device 405 owned by the user is put through a process in which the IoT device 405 is registered for the LTE terminal 400, for example, which is the main agent for interference control in the beginning of use. During the registration process, it is possible to set, for example, whether the interference control function in the present disclosure may be executed. Detailed descriptions on the registration process will be omitted.

Then, in step 410, the IoT device 405 determines whether an IoT device 405 is powered ON or comes within a sensing distance of the LTE terminal 400. In step 415, the LTE terminal 400 and the IoT device 405 execute an initial setting process. In the initial setting process, the IoT device 405 informs the LTE terminal 400 that a previously registered IoT device is in the powered-ON state (or has come within the sensing distance, requests device authentication and inquires as to whether the IoT device 405 may execute the interference control function in the present disclosure. Since peripheral IoT devices may come in or go out of the sensing distance at any time, the IoT device, which is in charge of interference control, needs to perform periodic monitoring. In general, short-range communication techniques, such as Bluetooth, periodically monitor devices that use the same short-range communication. When there is a previously registered device among the found peripheral devices, the short-range communication is enabled instantly. In step 420, the LTE terminal 400 determines whether there is potential for interference to occur between the LTE terminal 400 and the peripheral IoT devices or between the peripheral IoT devices. When there is potential for the interference to occur, in step 425, the LTE terminal 400 sets the IoT devices (or asks the IoT 405) to report information required for the interference control. There is the possibility that interference will occur, for example, when the frequency band used by the LTE terminal is adjacent to the ISM band or an operating frequency or measurement frequency is adjacent to the ISM band to exert an influence on typical LTE operations, such as communication and measurement. Or, there is also be potential for the interference to occur, for example, when short-range communications between the IoT devices may interfere with each other. When an inter-IoT device signal practically occurs according to the setting of the LTE terminal or data transmission is started using a specific wireless technique in step 430, the IoT device 405 reports signal information to the LTE terminal 400 in step 435. Alternatively, the IoT device 405 may report the signal information in advance before transmitting the signal. The signal information helps the LTE terminal determine whether interference practically occurs. The signal information may include, for example, a Bluetooth signal pattern(s), the starting point of time (i.e., offset), an absolute time, a transmission power, and a significance (or priority) of traffic.

Alternatively, when the IoT device informs the LTE terminal 400 of execution of a transmission/reception operation, in step 440, the LTE terminal 400 may directly monitor the signal of the IoT device so as to collect required information. Or, both the two methods described above may be executed. Based on the information, the LTE terminal 400 determines whether interference practically occurs in step 445, and when it is determines that the interference occurs, the LTE terminal 400 decides a proper interference avoidance method in step 450. The LTE terminal 400 selects at least one method among the interference avoidance methods to be described below, and attempts interference avoidance.

1. Avoidance Through Resetting of LTE Signal

When interference occurs between the LTE signal and Bluetooth (or wireless LAN), the LTE signal may be reset so as to prevent the LTE signal and Bluetooth from interfering with each other or to alleviate the interference. As for this method, a frequency division multiplex (FDM) method and a time division multiplex (TDM) method exist.

The FDM method refers to a method that shifts a serving LTE frequency that currently causes interference to a frequency spaced somewhat away from the ISM band. For this purpose, a frequency, at which the base station and the terminal do not cause the interference, shall also be supported.

The TDM method refers to a method that changes Discontinuous Reception (DRX) or HARQ process setting of the LTE signal so as to temporally separate the LTE signal from the Bluetooth (or wireless LAN) signal. The TDM may be somewhat complicated but may be actively applied when a supportable frequency is limited. In order to reset the LTE signal described above, In-Device Coexistence (IDC)—an existing LTE standard technique—may be utilized. That is, in step 455, the LTE terminal 400 may execute IDC triggering to a network entity (e.g., evolved Node B (eNB)). The IDC technique will be described in detail below.

2. Avoidance Through Change of Short-Range Communication Technique

Short-range communication techniques are highly diversified and include, for example, Bluetooth, wireless LAN, zigbee, and NFC. In addition, an IoT device may include a plurality of short-range communication modules so as to support various applications. Accordingly, different short-range communications may be used for the same purpose. In a case where occurrence of interference is expected when the Bluetooth communication is used, in step 460, the LTE terminal 400 requests the IoT device 405 to change the short-range communication technique to be used to another communication technique which is expected not to cause interference, for example, wireless LAN or zigbee.

3. Change of Scheduling of Short-Range Communication

The short-range communications, such as Bluetooth, use a method of transmitting data on a predetermined cycle. Accordingly, when the predetermined cycle is properly adjusted, the interference between the LTE signal and the signals of the other IoT devices may be avoided or alleviated through the TDM method.

In selecting a proper interference avoidance method, significance (or priority) of traffic between respective IoT devices may be taken into consideration. For example, when the user makes an emergency call using the LTE terminal, the significance of the corresponding traffic may be considered highest. In such a case, when there is a signal of the other IoT which interferes with the LTE terminal signal, the short-range communication technique of the other IoT devices may be changed rather than resetting the signal of the LTE terminal. This is because resetting of the signal of the LTE terminal requires a time therefor and the emergency call may not be smoothly made during the resetting. Similarly, when the smart watch collects and transmits the user's current health condition information, such as heart rate, this may be considered higher in priority than the signals of the other IoT devices.

When transmission/reception of the IoT devices is terminated, informing the main agent device that controls the interference of the termination of transmission/reception is helpful for the main agent device to adjust the interference. This is because the interference avoidance method may be re-adjusted considering the interference which does not exist anymore. For this purpose, the IoT devices may directly inform the main agent device that controls the interference of the termination of transmission/reception. Alternatively, the main agent device may directly monitor the transmission/reception operations of the IoT devices, and when the transmission/reception is not made for a predetermined length of time, the main agent device determines that the transmission/reception is terminated. In the former case, an IoT device may not inform the main agent device of the termination due to a certain reason. For example, when the IoT device is rapidly moved away from the user, the IoT device may not inform the main agent device of this. Accordingly, defining an operation for compensating this is needed. The latter case has a disadvantage in that the power consumption of the main agent device increases.

FIG. 5 is a flowchart for describing a procedure of controlling inter-IoT device interference in a case where a main agent for controlling interference in the present disclosure is an LTE terminal.

After the power is turned ON in step 510, an IoT device 505 searches for a master device in step 515. Here, the master device refers to a device that is in charge of control of inter-device interference. Here, an LTE terminal 500 becomes the master device. At the initial stage of use, the IoT device should go through a process of registering with the LTE terminal 500 at least one time. In the registration process, for example, whether or not the IoT device is to be subjected to an interference control of the LTE terminal 500 will be selected by the user or automatically (by taking the capability of the IoT device 440 into consideration). Upon finding the LTE terminal 500, the IoT device performs an operation of informing the LTE terminal 500 of turning-ON of the power in step 520. In addition, for example, a synchronization operation for interworking between the kinds of short-range communications that can be used by the IoT device, and between the LTE terminal 500 and the IoT device 505 is performed. Information exchange between the LTE terminal 500 and the IoT device 505 is performed using, for example, a short-range communication, such as Bluetooth or wireless LAN. The LTE terminal 500 determines whether to apply the interference control method in the present disclosure to the IoT device in consideration of, for example, a frequency band and frequency bandwidth which will be used by itself and a communication technique to be used by the IoT device. For example, when the IoT device 505 uses a Bluetooth or wireless LAN communication technique that employs the ISM band, the LTE terminal 500 determines whether at least one of the following conditions is satisfied.

Condition 1: whether at least one of the frequencies instructed to the LTE measObjectEUTRA IE by the terminal 500 may be interfered with by the ISM band or may cause interference with the ISM Band (that is, whether at least one frequency is adjacent to the ISM band)

Condition 2: Whether a frequency band supported by the LTE terminal 500 is positioned adjacent to the ISM band In other words, when frequencies related to, for example, data transmission/reception and measurement which are typical LTE operations are positioned adjacent to the ISM band, there may be interference therebetween when the IoT device transmits data using the ISM band. In an embodiment of the present disclosure, only the ISM band and LTE frequencies adjacent thereto are mentioned, the descriptions may also be equally applied to all the short-range communication frequencies and frequencies of mobile communications other than the LTE.

When at least one of the above-mentioned conditions is satisfied, the LTE terminal 500 sets the IoT device 505 to provide information required for interference control in step 535. The conditions may be varied over time. That is, the use frequency of the LTE terminal 500 may be shifted to a frequency that does not exert influence on the ISM band. Accordingly, it is needed to correct the former setting. For this purpose, resetting may be executed with respect to the IoT device 505. Alternatively, the expiration date for the previous setting may be determined based on a timer. This is because the LTE terminal 500 and the IoT device 505 may be suddenly separated away from each other such that specific information cannot be exchanged therebetween. For example, the user may leave the IoT device 505 far behind. In this case, it is impossible to reset the set information, which has been previously provided by the LTE terminal 500, through signaling. This may cause the IoT device to unnecessarily report the information requested by the LTE terminal 500 in response to data transmission/reception even though the information has not been practically transmitted. Accordingly, at the time of setting, a specific timer is operated by both of the LTE terminal 500 and the IoT device 505, and it is determined that the setting is only effective until the timer expires. When it is desired to extend the validity of the setting, the LTE terminal 500 may execute resetting before the timer expires. In addition, when the LTE terminal 500 does not send feedback even if the IoT device 505 has reported related information to the LTE terminal 500 several times after initiating the short-range communication, it may be determined that the previous setting is not effective any more. The above-mentioned number of reporting times may be included at the time of setting (step 535). In step 545, the LTE terminal 500 performs a communication with the base station. When the IoT device 505 transmits/receives data using Bluetooth, in step 555, the IoT device 505 reports, for example, the kind of used communication technique (e.g., Bluetooth), used frequency information, characteristics of Bluetooth signal (signal pattern(s), offset, transmission power), absolute time, or the kind (or priority) of traffic, to the LTE terminal 500. The report may be made either before or after the practical Bluetooth communication is performed. After receiving the report, the LTE terminal 500 determines that the practical Bluetooth communication has just started or will start soon. In step 565, the IoT device 505 executes data transmission/reception using the Bluetooth. As in step 560, the LTE terminal 500 may monitor a communication signal of the IoT device 505 through a wireless channel. Through the monitoring, the LTE terminal 500 may directly collect signal characteristic information, or may grasp, for example, termination of signal transmission/reception. Accordingly, an alternative, in which by combining the monitoring, the IoT device 505 does not report all the information items described above to the LTE terminal 500 but reports only specific information items, and the LTE terminal 500 directly monitors and collects remaining information items, may be taken into consideration. The specific information items are the absolute time, the kind (or significance) of traffic, and the information items collected through the monitoring are information items which may be wirelessly collected by the LTE terminal 500. For example, a Bluetooth signal characteristic and frequency information may be the information items collected through the monitoring. The LTE terminal 500 determines whether practical interference may occur or not, based on the information reported by the IoT device.

As another alternative, without any report from the IoT device, the LTE terminal periodically monitors whether or not interference caused by peripheral IoT devices exists, and when interference between the LTE and the IoT devices or between the IoT devices is sensed, the LTE terminal may measure and collect the above-mentioned specific information items wirelessly and may perform an operation avoiding the interference.

Although only the interference between the LTE terminal and the IoT devices are illustrated in FIG. 5, interference between another IoT device and still another IoT device may also be determined. When the LTE terminal 500 also is performing data transmission/reception or measuring using a frequency which may exert on the ISM band, an interference avoidance method is applied in step 570. The LTE terminal 500 should also determine which interference avoidance method is applied. First, the traffic of the LTE terminal 500 and the kind of traffic of the IoT device may be taken into consideration. The kind of traffic may be represented as the significance (or priority) of data which is being transmitted/received. When the LTE terminal 500 is transmitting/receiving important data such as an emergency call, the LTE terminal 500 will instruct the IoT device 505 to execute an interference avoidance operation. On the contrary, when the IoT device is transmitting/receiving data in need of urgency such as transmission of urgent health information, the LTE terminal 500 itself will execute an interference avoidance operation. When the LTE terminal 500 executes the interference avoidance operation, the existing IDC technology is utilized in step 575. The LTE terminal 500 transmits InDeviceCoexIndication message to the base station. The message includes information required when avoiding the interference with the FDM or TDM method. Thus, in step 585, the base station may set the LTE terminal 500 to avoid the interference using an RRC message. The LTE terminal 500 may indicate an interference avoidance technique to the IoT device 505, which is executing a short-range communication. As described above, the LTE terminal 500 may instruct the IoT device 505 to use other short-range communication or request a change in the scheduling pattern. When the transmission/reception by the LTE terminal 500 is very important and there is not interference avoidance method used by the IoT device 505 (when there is a single short-range communication technique or scheduling change is impossible), the LTE terminal 500 may instruct the IoT device 505 to stop or postpone the transmission/reception. When the short-range communication is terminated in step 590, the IoT device 505 informs the LTE terminal 500 of the termination. Or, when a transmission/reception signal from the IoT device 505 is not sensed for a predetermined length of time, the LTE terminal 500 considers that the transmission/reception is terminated. In addition, with respected to all the messages 520, 535, 555, 580, 590, and 595 exchanged between the LTE terminal 500 and the IoT device 505, the counterpart transmits a kind of feedback, and depending on whether the feedback is received or not, it is possible to determine whether the two devices exist within two effective distances from each other. The effective distance is a distance between respective IoT devices and may be defined, for example, within a human body size. As an option, the LTE terminal 500 may transmit a message, "release the setting," to the IoT device 505.

FIG. 6 is a view for describing IDC which is an existing LTE technique.

IDC refers a technique for minimizing interference when multiple communication modules interfere with each other. State-of-the-art terminals of have various functions, and are provided with various communication modules for supporting the functions. In addition to an LTE communication module 600, for example, a Global Positioning System (GPS) module 605 used for geographical location identification, or a short-range communication module 610, such as Bluetooth or wireless LAN, may be provided. The module transmits/receives required data via, for example, antenna 615, 620, and 625 which are connected thereto, respectively. The frequency bands of respective communication systems are different from each other. However, upon using adjacent bands, an inter-communication module interference may be caused. This is caused because the transmitted/received signals cannot be ideally separated between the bands. Moreover, each communication module and an antenna connected therewith are included in one terminal device, and thus, are positioned very close to each other. Thus, the interference intensity acting therebetween may be relatively high. Accordingly, in order to alleviate the interference, controlling the transmission power between the communication modules is needed. For example, when a short-range communication module 610, such as the Bluetooth or wireless LAN, attempts data reception at LTE uplink, a transmission signal of the LTE communication module 600 may interfere with the short-range communication module 610. In order to alleviate this, the interference amount may be controlled by limiting the uplink maximum transmission power of the LTE communication module 600. Alternatively, the interference power exerting an influence on the short-range communication module 610 may be removed by temporarily stopping the operation of the LTE communication module 600. On the contrary, the short-range communication module 610 may interfere with a reception signal of the LTE communication module 600 at the LTE downlink Although the IDC technique is a technique for avoiding interference between various communication modules within a device, the IDC technique may be sufficiently utilized for avoiding interference between various communications of other devices positioned close to each other as in the present disclosure.

FIG. 7 is a view for describing a procedure in which a terminal provides information required for minimizing IDC interference in an existing LTE standard to a base station.

As described above, in order for an LTE terminal 700 itself to avoid interference from/to the Bluetooth or wireless LAN communication, an FDM or TDM method may be used.

The FDM method refers to a method in which the LTE terminal 700 reports information on an frequency interfering with other short-range communications to a base station 705 using an RRC message (InDeviceCoexIndication). Then, the base station 705 instructs the LTE terminal 700 to execute handover so as to use a frequency affected by the interference. The TDM method is a method that temporally separates and avoids interference by adjusting, for example, a DRX or (Hybrid Automatic Repeat Request (HARQ) process pattern (or HARQ bit map pattern) while maintain an existing serving frequency.

For example, the base station 705 uses an RRC Connection Reconfiguration message in step 710 in order to provide various setting information items, such as cell measurement and DRX, to the LTE terminal 700. When it is determined that frequencies, for which a measurement instruction is received from the base station 705, are affected by the IDC inference, the LTE terminal 700 transmits DRX setting information, which is capable of minimizing the IDC interference, to the base station 705 using the InDeviceCoex-Indication message, in step 715. The DRX setting information includes DRX cycle information, offset information that notifies a DRX start time, and DRX active time information.

DRX cycle length: The DRX cycle length is a distance length between an arbitrary activation period and the next activation. As the DRX cycle length increases, a sleeping period increases and the power consumption of a terminal is reduced. However, when the DRX cycle length is long, a disadvantage occurs in that a call delay increases. The DRX cycle length is signaled by a network.

Offset information: The official information is usually induced from a unique identifier of a terminal and the DRX cycle length. For example, a value obtained by performing a mode operation on the identifier of the terminal by the DRX cycle length the identifier of the terminal may be used as a starting time of the activation period.

DRX active time: The DRX active time means a length of a period in which the terminal is awake during one activation period, and a predetermined value is usually used for the DRX active time. For example, the length of the activation period in a mobile communication system is 10 msec.

Table 1 below represents DRX setting information for minimizing IDC interference defined in LTE Standard Document 3GPP S36.331.

TABLE 1

| | |
|---|---|
| drx-CycleLength-r11 | ENUMERATED {sf40, sf64, sf80, sf128, sf160, sf256, spare2, spare1}, |
| drx-Offset-r11 | INTEGER (0..255) OPTIONAL, |
| drx-ActiveTime-r11 | ENUMERATED {sf20, sf30, sf40, sf60, sf80, sf100, spare2, spare1} |

Here, sf40 represents 40 sub-frame units. In particular, drx-Offset represents an offset value indicating a DRX starting time, and is defined as Equation 1 below.

$$[(SFN*10)+\text{subframe number}] \bmod (\text{drx-CycleLength}) = \text{drx-Offset} \quad \text{Equation 1}$$

As indicated in Equation 1, SFN (System Frame Number) is used. SFN represents an order number of a radio frame and has a value from 0 to 1023. After one SFN period (0-1023), the next SFN period is started again from the value of 0.

FIG. 8 is a flowchart for describing a process in which an IoT device authorized to control interference controls interference between the other IoT devices.

Two IoT devices 805 and 810 exist around an LTE terminal 800 authorized to control interference. The two IoT devices will be subjected to the interference control of the LTE terminal through an initial setting process (step 815). In step 820, the LTE terminal 800 determines whether or not an interference control between the peripheral IoT devices including itself is required. When it is determined that the interference control is required, the LTE terminal 800 sets each of the IoT devices 805 and 810 to report information required for the control (steps 825 and 830). When the IoT device 1 805 starts data communication (step 835), the IoT device 1 805 reports transmission signal information to the LTE terminal 800 (step 840). The LTE terminal 800 may monitor the signal of the IoT device wirelessly (step 845). The LTE terminal 800 determines whether interference practically occurs between itself and the peripheral IoT devices (step 850), and when it is determined that there is no interference (step 855), the LTE terminal 800 does not perform a specific operation. Meanwhile, when the IoT device 2 810 starts data communication (step 860), the IoT device 2 810 also reports the transmission signal information to the LTE terminal 800 (step 865). The LTE terminal 800 may monitor the signal of the IoT device wirelessly (step 870). The LTE terminal 800 determines whether or not interference practically occurs between itself and the peripheral IoT devices (step 875). When it is determined that interference occurs with the IoT device 1 805 which has been already performing data communication, the LTE terminal 800 determines a method for avoiding the interference (step 880). First, it should be determined which one of the two devices will perform the avoidance operation. Occasionally, both devices may perform the avoidance operation. In order to select the device to perform the avoidance operation, various items may be taken into consideration.

First is a kind of traffic of each device. As described above, a device to perform the avoidance operation may be selected depending on how, a service which is on the way of transmission/reception, is significant. In general, when the avoidance operation is performed, it is difficult to normally transmit/receive data communication during that time. Accordingly, when emergent data (e.g., body health information) or data sensitive to time delay is transmitted/received, the avoidance operation may be avoided. When the services of two devices are the same in terms of significance, effects obtained by performing the avoidance operation may be taken into consideration. When the transmission/reception capability of the device that has performed the avoidance operation is very poor, the device which is less expected to deteriorate in performance may perform the avoidance operation. The interference control between short-range communication devices may be performed through various methods.

First method: To change a short-range communication technique in use (e.g., Bluetooth→wireless LAN, zigbee)

Second method: To adjust a short-range communication scheduling in use (e.g., adjustment of a cycle pattern of Bluetooth signal cycle)

LTE terminal 800 selects a device which will perform the avoidance operation, determines an avoidance operation method, and instructs the related IoT device to execute the same (steps 885 and 890).

FIG. 9 is a view for conceptually describing a procedure in which an authority of controlling interference is transferred to another IoT device.

One user 910 has three kinds of IoT devices in total, for example, an LTE terminal 915, a wireless headset 925, and a smart watch 930. At this time, it is assumed that the LTE terminal 915 is authorized to control interference. The user 910 may possess and use a new IoT device. For example, the user 910 is riding in a wirelessly connectable car. The car includes various communication modules to be capable of wirelessly connecting with various peripheral IoT devices and providing services that can enhance the user's convenience. In addition, the car is directly connected with an LTE base station (step 905) to be capable of providing data communication to the user. In general, the car may be supplied with abundant power compared to the LTE terminal 915. Accordingly, when the authority to control the interference is transferred to the car, the power consumption of the LTE terminal 915 may be reduced. The car, having the interference control function, is invested with the authority from the LTE terminal 915 (step 920) and controls not only the LTE terminal 915 but also the peripheral IoT devices (step 920). The final decision for transferring the authority may be made by the user or according to a role designated in advance by the user. For example, the user may register in advance the IoT devices capable of executing the authority together with priorities thereof. When a device which currently has the authority comes within a sensing distance of another device having the authority, it is confirmed that both the devices have the authority through the initial setting process and the authority is transferred depending on the priorities thereof. Or, setting may be made such that the fact that there is another device having the authority around is indicated to the user so that the user can render the final decision.

At the initial state of use, when an IoT device, for which the LTE terminal 915 is set as the device having the control authority, is powered ON, the IoT device informs the LTE terminal 915 of the power-ON first, and executes the initial setting process. However, the device currently having the authority is the car. Accordingly, the LTE terminal 915 needs to transfer the control authority and instruct the device, which is powered ON, to be controlled by the car. In addition, in a case of a certain IoT device, when the IoT device is powered ON, a plurality of devices, which had the authority in the past, may be found. In this case, the initial setting process is performed on a specific device according to a prescribed rule. For example, the initial setting process may be performed on any of a device which had the authority last, a device which had the authority earliest, and a device which had the authority in the past. Even if the IoT device performs the initial setting process on a device which does not currently have the authority, the device will render an instruction to the IoT device as the device currently having the authority.

FIG. 10 is a flowchart for describing a procedure in which an authority of controlling interference is transferred to another IoT device.

An LTE terminal 1000, which currently has the authority to control interference, controls the interference of the IoT device 2 1010. At this time, the IoT device 1 1005 comes within a sensing distance to execute the initial setting process (step 1015). The LTE terminal decides to transfer the authority to the IoT device 1 1005 (step 1020). At this time, the LTE terminal indicates the authority transfer to the IoT device 1 1005 and the IoT device 2 1010 (step 1025 and step 1030). From this time, the LTE terminal and the IoT device 2 1010 reports the information related to data transmission/reception (step 1035) to the IoT device 1 1005 (step 1040). The IoT device 1 1005 which is invested with the authority monitors signals of the peripheral IoT devices (step 1045), and determines whether or not interference occurs between itself and the peripheral IoT devices (step 1050). When it is determined that interference occurs (step 1055), the IoT device 1 1005 may instruct the IoT device to adjust the interference (step 1065). The IoT device 2 1010 may transfer the authority again (step 1070), and may indicate this to the device, to which the authority will be transferred (step 1075). Or, when an IoT device having the authority is not sensed within the sensing distance any more, a device, which had the authority in the past, or a device, which has the interference control function, may trigger the initial setting process to the peripheral IoT devices (step 1080). The peripheral IoT devices execute the initial setting process depending on the non-existence of the device which had the authority (step 1085), and through the process, a new device having the authority is decided and will follow the instruction of the device.

FIG. 11 is a block diagram illustrating an internal configuration of a terminal according to an embodiment of the present disclosure.

A terminal transmits/receives, for example, data to/from an upper layer 1110, and transmits/receives control messages via a control message processing unit 1115. In addition, when transmitting a control signal or data to a base station, the terminal multiplexes the data through a multiplexing device 1105 according to a control of a controller 1120 and then transmits the data through a transmitter 1100. On the contrary, when receiving a signal, the terminal receives a physical signal through a receiver 1100 according to a control of the controller 1120, then, demultiplexes the received signal through a demultiplexing device 1105, and transmits the signal to the upper layer 1110 or the control message processing unit 1115 according to the message information.

Meanwhile, in the foregoing, it has been described that the terminal is constituted with a plurality of blocks which execute different functions, respectively. However, this is merely an embodiment, and the present disclosure is not limited thereto. For example, the function executed by the demultiplexing device 1105 may be executed by the controller 1120 itself.

Meanwhile, it may be appreciated that a method and apparatus for controlling inter-IoT device interference according to an embodiment of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It will be appreciated that the method for controlling interference between Internet of things devices may be implemented by a computer or a portable terminal including a controller and a memory, and the memory is one example of machine-readable devices suitable for storing a program or programs including instructions that implement embodiments of the present disclosure.

Accordingly, the present disclosure includes a program for a code implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present disclosure appropriately includes equivalents of the program.

In addition, the apparatus of controlling inter-IoT device interference according to the present disclosure may receive and store a program from a program providing device connected thereto in a wired or wireless manner. The program providing device may include: a program including pre-set instructions that cause the program processing device to execute a method of controlling inter-IoT device interference; a memory that stores, for example, information required for the method of controlling inter-IoT device interference; a communication unit that performs wired or wireless communication with the program processing device; and a controller that transmits the program according to a request of the program processing device or automatically.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

The invention claimed is:

1. A first device, from among a plurality of devices that are capable of performing inter-device communication, for controlling interference, the first device comprising:
    a transceiver; and
    a controller coupled with the transceiver and configured to:
        select, based on a priority of at least one signal which is being transmitted to the plurality of devices or received from the plurality of devices, from among the plurality of the devices, a second device executing interference avoidance,
        receive, from the second device, signal information required for the interference avoidance among the plurality of devices, and
        determine an interference avoidance method for the plurality of devices based on the signal information,
    wherein the interference avoidance method comprises at least one of:
        resetting a frequency or a time of signal of at least one of the plurality of devices,
        changing a short-range communication technique of at least one of the plurality of devices to other short-range communication technique, or
        changing of scheduling of a short-range communication by at least one of the plurality of devices.

2. The first device of claim 1, wherein the signal information comprises at least one of a pattern of a short-range communication signal, an absolute time, a signal transmission power, or an offset information representing a starting time.

3. The first device of claim 1, wherein the frequency of the signal of the at least one of the plurality of devices is reset, if the interference occurs between a mobile communication signal and the short-range communication technique.

4. The first device of claim 1, wherein the short-range communication technique of the at least one of the plurality of devices is changed to other short-range communication technique, if the interference occurs between a mobile communication signal and a short-range communication technique.

5. The first device of claim 1, wherein the scheduling of a short-range communication by the at least one of the plurality of devices is changed, if the interference occurs between a mobile communication signal and a short-range communication technique.

6. The first device of claim 1, wherein the controller is further configured to: if it is determined that frequencies, for which a measurement instruction is issued from a base station, is affected by In-Device Coexistence (IDC) interference, transmit an InDeviceCoexIndication message to the base station.

7. The first device of claim 6, wherein the InDeviceCoexIndication message comprises a discontinuous reception (DRX) setting message which is capable of minimizing the IDC interference.

8. The first device of claim 7, wherein the DRX setting message comprises DRX cycle information, offset value information notifying DRX starting time, and DRX active time information.

9. The first device of claim 1, wherein the controller is further configured to:
    determine to transfer an authority to at least one device that will execute interference avoidance, and
    transmit an indicator for indicating an authority transfer from another device from among the plurality of devices.

10. The first device of claim 1, wherein the controller is further configured to receive an indicator for indicating an authority transfer from another device from among the plurality of devices.

11. A method for avoiding interference implemented in a first device from among a plurality of devices that are capable of performing inter-device communication, the method comprising:
    selecting, based on a priority of at least one signal which is being transmitted to the plurality of devices or received from the plurality of devices, from among the plurality of the devices, a second device for executing interference avoidance;
    receiving, from the second device, signal information required for the interference avoidance among the plurality of devices; and
    determining an interference avoidance method for the plurality of devices based on the signal information,
    wherein the interference avoidance method comprises at least one of:
        resetting a frequency or a time of signal of at least one of the plurality of devices,
        changing a short-range communication technique of at least one of the plurality of devices to other short-range communication technique, and
        changing of scheduling of a short-range communication by at least one of the plurality of devices.

12. The method of claim 11, wherein the signal information comprises at least one of a pattern of a short-range communication signal, an absolute time, a signal transmission power, or an offset information representing a starting time.

13. The method of claim 11, wherein the frequency of the signal of the at least one of the plurality of devices is reset, if the interference occurs between a mobile communication signal and a short-range communication technique.

14. The method of claim 11, wherein the short-range communication technique of the at least one of the plurality of devices is changed to other short-range communication technique, if the interference occurs between a mobile communication signal and a short-range communication technique.

15. The method of claim 11, wherein the scheduling of a short-range communication by the at least one of the plurality of devices is changed, if the interference occurs between a mobile communication signal and a short-range communication technique.

16. The method of claim 11, further comprising:
    if it is determined that frequencies, for which a measurement instruction is issued from a base station, is affected by In-Device Coexistence (IDC) interference, transmit an InDeviceCoexIndication message to the base station.

17. The method of claim 16, wherein the InDeviceCoex-Indication message comprises a discontinuous reception (DRX) setting message which is capable of minimizing the IDC interference.

18. The method of claim 17, wherein the DRX setting message comprises DRX cycle information, offset value information notifying DRX starting time, and DRX active time information.

19. The method of claim 11, further comprising:
determining to transfer an authority to at least one device that will execute interference avoidance; and
transmitting an indicator for indicating an authority transfer from another device from among the plurality of devices.

20. The method of claim 11, further comprising:
receiving an indicator for indicating an authority transfer from another device from among the plurality of devices.

\* \* \* \* \*